Figure 1:
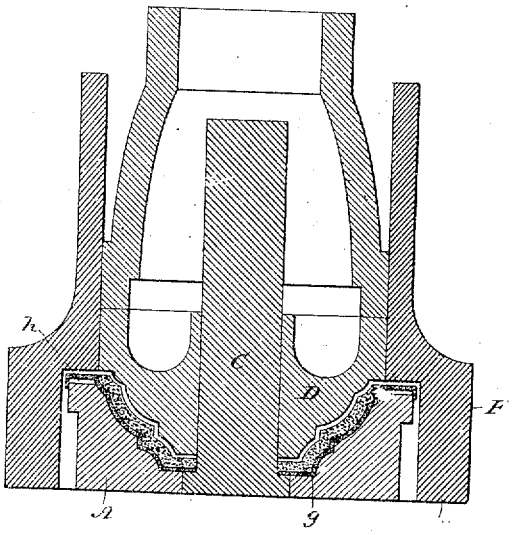

2 Sheets—Sheet 1.

G. M. STEVENS & H. J. CHISHOLM.

Machine for Making Frames or Casings for Lamps from Paper Pulp.

No. 9,593. Reissued March 1, 1881.

Attest:

R. H. Barnes

Frank Middleton

Inventor:

Grenville M. Stevens

Hugh J. Chisholm by Ellis Spear

Attorney

2 Sheets—Sheet 2.

G. M. STEVENS & H. J. CHISHOLM.

Machine for Making Frames or Casings for Lamps from Paper Pulp.

No. 9,593. Reissued March 1, 1881.

*Attest:*

R. F. Barnes

Frank Middleton

*Inventor:*

Grenville M. Stevens

Hugh J. Chisholm by Ellis Spear

Attorney.

UNITED STATES PATENT OFFICE.

GRENVILLE M. STEVENS, OF DEERING, AND HUGH J. CHISHOLM, OF PORTLAND, MAINE.

MACHINE FOR MAKING FRAMES OR CASINGS FOR LAMPS FROM PAPER-PULP.

SPECIFICATION forming part of Reissued Letters Patent No. 9,593, dated March 1, 1881.

Original No. 234,694, dated November 23, 1880. Application for reissue filed January 10, 1881.

*To all whom it may concern:*

Be it known that we, GRENVILLE M. STEVENS, of Deering, and HUGH J. CHISHOLM, of Portland, both in the county of Cumberland and State of Maine, have invented certain new and useful Improvements in Machinery for Making Frames or Casings for Lamps from Paper-Pulp; and we do hereby declare that the following is a full, clear, and exact description thereof.

Our invention relates to machinery and process for making articles, such as lamp frames or casings, whip-sockets, boot-heel blanks, and other articles capable of being molded from pulp in dies.

Heretofore it has been common to mold articles of various forms from plastic materials, and articles both solid and hollow have been made from paper and other pulp by pressure applied to the pulp while on a former or a die, such former or die having perforations for the purpose of permitting the discharge of water from the compressed pulp.

The articles which we propose to make are formed of clear pulp, not requiring the admixture of any binding material, and requiring great pressure to form and consolidate them. Such pressure it is not practicable to apply to dies or formers which are perforated to permit the escape of the moisture; and, further, when concave or irregular articles are to be formed under such pressure the pulp has been found not to condense uniformly, those parts directly in front of the moving die or plunger receiving the greater pressure and the others less.

To obviate these objections, and to produce articles from pulp of a liquid or semi-liquid condition by simple pressure, is the object of our invention, which consists, essentially, first, of dies adapted to drain over the rim of that part of the die containing the article to be formed; second, in using a flexible drainer; third, in special forms of dies; and, fourth, in an improved process for polishing the article pressed.

To illustrate the principle and mode of operation of our invention we have described it more particularly as applied to produce halves of the exterior bowls or casings of lamps, and the apparatus shown in the drawings is particularly designed for that article.

Figure 2:
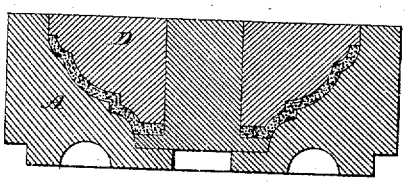
Figure 3:
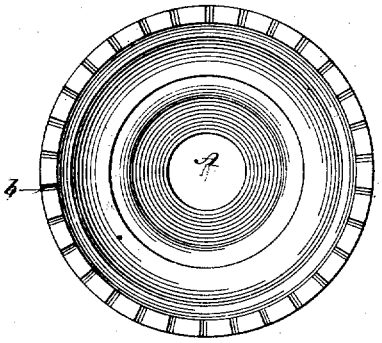
Figure 4:
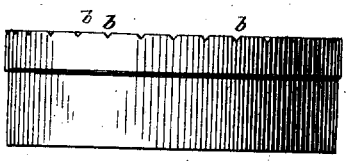

In these drawings, Figure 1 represents a vertical section through the entire mechanism. Fig. 2 represents a vertical section through the second set of dies. Fig. 3 represents a top view of the female die, showing the notches at the top. Fig. 4 represents a side view of the same.

In these drawings, A represents the lower or female die, which is adapted in shape to the form required of the half of the bowl of a lamp. The plunger D is formed at its end of a shape corresponding to that of the inner surface of the die A. It is fitted snugly within a cylindrical casing, F, the lower part of which incloses the die A. The cylinder F is formed with an offset, *h*, which extends over the rim of the die A, the under surface of the offset being a very slight distance above the upper surface of the rim, but leaving a space sufficient for the overlapping edge of the chamois-skin or other material hereinafter described. A round rod, C, is placed in the center of the die A, projecting upward into the cylinder F. The plunger D has a perforation closely fitted to the rod C, so that the plunger, as it descends, passes down the rod within the casing, and presses the pulp in its descent. The cylindrical casing F should extend up sufficiently far to hold pulp enough to form the article to be compressed.

The parts described may be made of any material suited for the purpose, such materials being well known to those skilled in the art, and pressure may be applied to the plunger D in any of the well-known ways.

Before pouring the pulp into the cylinder F we place over the die A a drainer, *g*, which we make of chamois-skin or felt, in one or more layers, or some equivalent material sufficiently porous to allow the passage of the water which is to be drained from the pulp. This drainer, in the form of die shown in the drawings, must be made with an opening to fit the central rod, C. It must be laid smoothly upon the surface of the die A, and extended over the rim of the same, so as to be between the upper surface of said rim and the overhanging shoulder or offset of the casing F, this porous material serving to carry off the water over the edge when the pulp is subjected to the final pressure. We form upon the rim of the die A small notches, *b*, to facilitate the discharge of the water.

In operating this mechanism the drainer is first laid within the die A, extending over the edges thereof, and the cylindrical case F is lowered into place. The pulp is then poured into the case, of which the die A then forms the bottom, and when enough of the pulp has been introduced for the article designed the plunger D is brought down by gradual pressure, expelling the water from the pulp and consolidating and pressing it into proper shape. As the plunger D enters the die A it forces the water remaining in the pulp upward and expels it, through the porous skin or other material, over the edge of rim, and leaves the article of practically-uniform density throughout. The time required for the expulsion of the water will depend upon the pressure; but it may be generally stated to be from two to ten minutes under a pressure ranging from one hundred to two hundred and fifty tons.

The opening left by the rod C serves, in the special article shown, for the purpose of attaching the pillar to the lower half of the bowl or the metal top, in case the piece be used for the upper half. If the article to be made does not require an opening—such, for example, as a boot-heel blank—the rod C is omitted and the form of the die changed accordingly.

The invention is intended for the manufacture of all articles capable of being molded from pulp in the same way, and is specially adapted for the manufacture of articles having one surface hollow or dish shape, such as boot-heel blanks, whip-sockets, and many others. Its special applicability in this case arises out of the described operation of the method of draining that portion of the pulp which forms the sides of articles, such as that shown surrounding the hollowed surface. These sides are out of the line of direct pressure, and receive such pressure laterally only; but by our method they are drained equally with that which falls directly beneath the pressure of the die.

In case a more polished surface be required than that given by the first pressure of the die, we subject the article to a momentary pressure in a second die, such as that shown in Fig. 2, a trifle smaller than the first, and made preferably with a polished surface. This gives a smooth and polished surface to the article.

Having thus described our invention, what we claim as new, and desire to secure by Letters Patent, is—

1. The combination of the dies A and B with the exterior case and the flexible drainer, substantially as described.

2. The combination of a die, A, and casing F, having a shoulder or edge fitting over the rim of the die A, adapted to contain the pulp and to permit drainage over the rim of the die A, and the plunger D, fitting in said casing, substantially as described.

3. The combination, in a mold for making lamp-casings from pulp by compression, of the die A, the rod C, the plunger D, the cylinder F, the drainer *g*, and the notches *b*, substantially as set forth.

4. The combination of the drainer *g* and the notches *b* with the female die A, as and for the purpose set forth.

5. The process of forming finished articles out of pulp, as herein described, consisting in first compressing said pulp into the required form in dies, and afterward removing such articles and compressing them into a second set of dies, substantially as described.

GRENVILLE M. STEVENS.
HUGH J. CHISHOLM.

Witnesses to signature of G. M. Stevens:
SILAS W. ROBINSON,
BYRON D. VERRILL.
Witnesses to signature of H. J. Chisholm:
L. W. SEELY,
FRANK L. MIDDLETON.